UNITED STATES PATENT OFFICE.

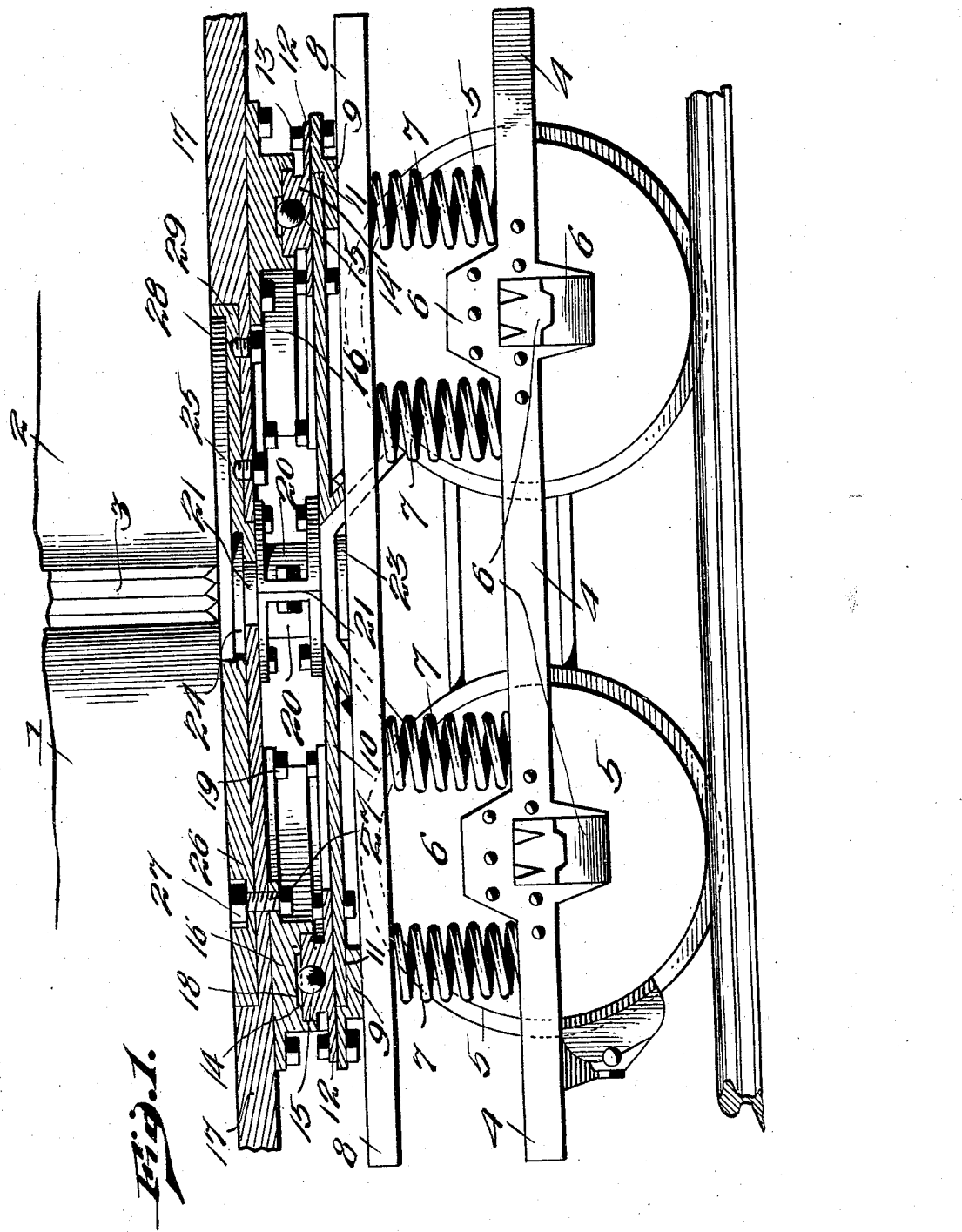

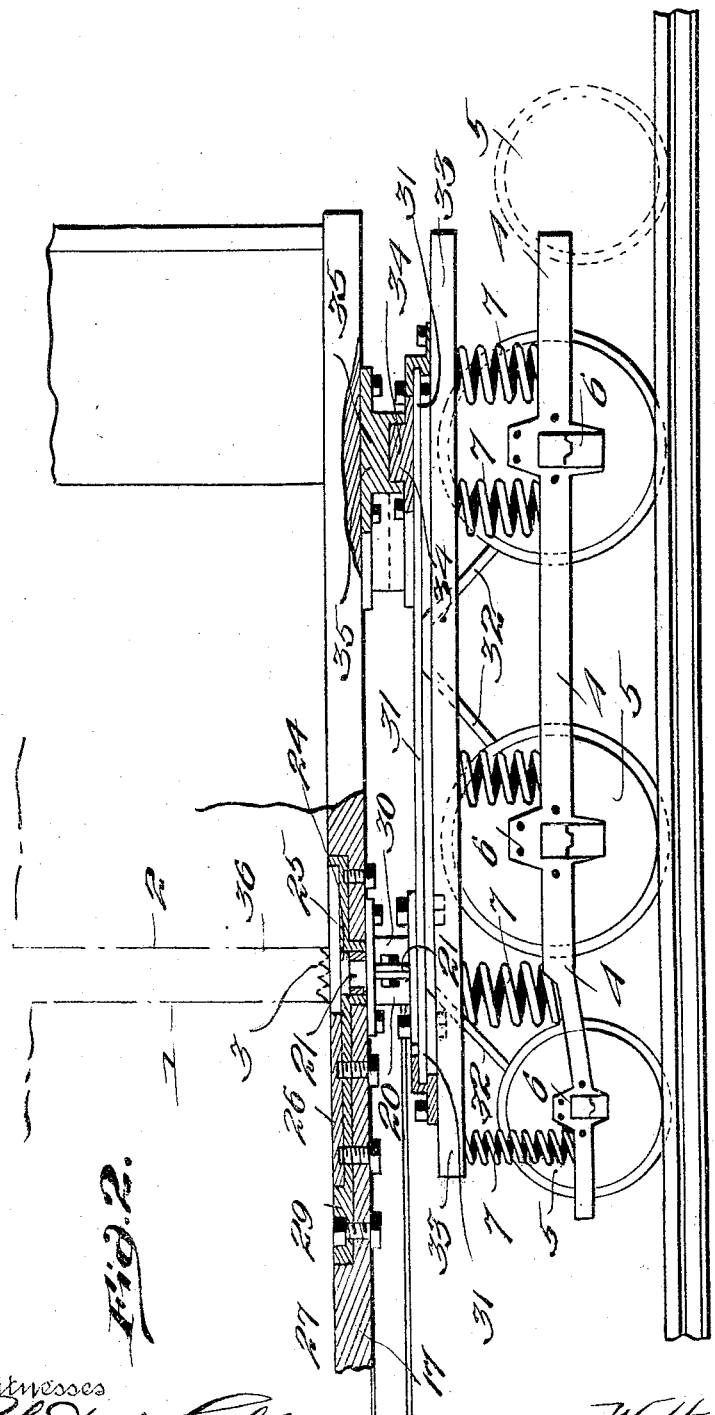

WALTER H. SON, OF NEW YORK, N. Y., ASSIGNOR TO MATHILDA SON, OF NEW YORK, N. Y.

CAR-TRUCK.

940,901.             Specification of Letters Patent.     Patented Nov. 23, 1909.

Application filed October 30, 1907. Serial No. 399,825.

*To all whom it may concern:*

Be it known that I, WALTER H. SON, a citizen of the United States, residing at New York city, in the county of New York and State of New York, have invented certain new and useful Improvements in Car-Trucks, of which the following is a specification.

The invention relates to improvements in car trucks and has particular reference to a pivotally mounted truck applicable for use in connection with the joining or coupling together of two cars or separate car bodies rendering said car bodies approximately one or a single compartmented car.

The object of the invention is the providing of a truck carrying a superstructure provided with means for pivotally mounting two car bodies together and also means for insuring the support of said separate car bodies on said truck, at the same time permitting the separate bodies to turn on any curve around a common center or pivotal point.

In the following is described in connection with the accompanying drawings one embodiment of the invention, the features thereof being more particularly pointed out hereinafter in the claims.

In the drawings Figure 1 is a longitudinal sectional view, parts being shown in side elevation to more clearly illustrate the invention; and Fig. 2 is a modified form of the invention illustrating the manner in which two car bodies may be pivotally connected together or the manner in which a single car body may be supported by a truck carrying a pivotal point beyond its central supporting center.

Similar numerals of reference indicate similar parts throughout the several views.

1 and 2 indicate separate car bodies joined together by the well-known collapsible vestibule inclosing means 3.

4 designates a truck frame carrying wheels 5 suitably mounted in bearing boxes 6. Said frame 4 has mounted thereon springs 7 supporting upper frame 8. Said upper frame 8 has suitably fastened thereto transverse channel irons 9 having fastened thereto superstructure 10 fastened in any suitable manner to the truck frames around the auxiliary supported frames attached to the under body structure of the truck. Said attaching means is not shown in the drawings embodying this application. Said superstructure 10 comprises laterally extending plates being fastened in grooves 11 on transverse channel irons 9. Said superstructure described as comprising a transverse plate has suitably mounted thereon at its respective ends thereof a semi-circumferential track 12 fastened to said transverse plate 10 by means of bolts 13. Said semi-circumferential track 12 has suitably formed therein a groove 14 adapted to receive ball bearings 15.

16 indicates a reception guide fastened to the under side of the body foundation or floor structure 17 of the respective car bodies, and has formed therein a groove 18 adapted to rest on ball bearings 15 carried by said circumferential track 12. Said guide 16 is fastened to said floor structure 17 by means of bolts 19.

20 indicates a bearing structure supported by the superstructure of the car truck and transverse plates 10 and is so formed that the respective parts thereof may be fastened to each end of the respective car bodies, and, upon joining the same together, may be fastened tightly together at the central portions thereof as at 21 by any suitable means such as by bolts, etc. Said bearing 20 receives a downwardly extending shank or pivot 22 provided at its lower end with a head 23, said head being adapted to prevent the displacement of the car body supporting means in case of a buckling strain thereon. Said shank or pivot 21 has cast therewith a shouldered bearing surface 24 which is in turn cast with a top plate 25 rigidly fastened at one end thereof, as at 26, to the car body foundation or car floor 17 by means of bolts 27. The other end of said plate 25, as at 28, is semi-circumferential in form and engages a countersunk bed-plate 29 which is also supported or rigidly fastened in said car body floor 17. The end 28 of plate 25, described as being semi-circumferential in form, is loosely mounted on said countersunk bed-plate 29 and free to turn therein.

Referring to Fig. 2, the structure is approximately the same as that described in Fig. 1 of the drawings excepting that the pivotal point 30 may be placed in any suitable position on transverse plate 31 which is in turn supported by the superstructure 32 of the truck frame 33. Semi-circumferential track 34 and the reception guide 35 may also be placed in any suitable position on the car truck superstructure or supporting means. In constructing a car truck like the device shown in Fig. 2 of the drawings two separate cars could readily be joined together as indicated at 36, and said cars be pivotally supported by the trucks and at the same time be separated from one another and be practically two separate cars, but upon connecting the separate car bodies together the trucks would merely have to be drawn together and locked by any suitable locking means (not shown).

The structure as shown in Fig. 2 also illustrates the manner in which a single car body may be supported by a truck carrying a pivotal supporting means considerably beyond the center of support, the guides for said structure being shown at the other end of said truck. This structure would obviate greatly the necessity of opening the sides of a car body for discharging cargoes, etc.

It is obvious that in attaching two separate car bodies together to be thereafter supported at the connecting points thereof by a single truck, the superstructure of the truck may be made in any suitable manner to facilitate the connection of the separate car bodies. It is further obvious that two cars could readily be joined together and made applicable to run on any track system or road-bed and at the same time turn on any curve in said track system, the auxiliary supporting means including the semi-circumferential tracks and guides therefor insuring any displacement that might take place in the pivotal supporting means. It is not necessary that the semi-circumferential tracks have mounted therein ball bearings, but the engaging surfaces thereof may be flat and at the same time form an operative turning supporting structure. It is also obvious that the device as herein shown and described may be widely varied without departing from the spirit of the invention.

Matter not shown or described herein is reserved being shown and described in copending application, Ser. No. 399,826, filed Oct. 30, 1907.

What I claim and desire to secure by Letters Patent of the United States is:—

1. A device of the character described including a truck, a superstructure carried thereby, an auxiliary supporting foundation mounted thereon, a pivot, a bearing therefor, and a platform associated with said pivot adapted to form the floor of two separated car bodies, said platform being rigidly fastened to one of said car bodies and free to turn upon suitable supporting means in the other of said car bodies.

2. A device of the character described, comprising a truck, a superstructure mounted therein, an auxiliary superstructure associated therewith, a pivotal supporting means carried by said auxiliary superstructure, a pivotal shaft mounted in said pivotal supoprting means and a platform carried by said pivotal shaft, adapted to engage the ends of adjoining car bodies rigidly mounted in one of said car bodies and free to turn in the other of said car bodies.

3. A device of the character described including a truck, a superstructure carried thereby, an auxiliary supporting foundation mounted thereon, pivotal means carried by said auxiliary supporting foundation, independent car bodies provided with independent compartments associated therewith, a bearing for said pivotal means mounted on the under body structure of each of said car bodies and said auxiliary supporting means, countersunk sockets mounted in the adjoining ends of said car bodies, a platform mounted on said pivotal means adapted to rest within said countersunk sockets and form a continuation of the floor of said car bodies, semi-circular guide rails carried by said truck, and guides mounted on each of said car bodies adapted to engage each of said guide rails on said truck.

In testimony whereof I have hereunto signed my name in the presence of two subscribing witnesses.

WALTER H. SON

Witnesses:
ROBERT W. ASHLEY,
M. E. McNURCH.